April 2, 1968     R. S. BLOUGH     3,375,809
SWINE TETHER

Filed April 19, 1966     2 Sheets-Sheet 1

INVENTOR.
Ronald S. Blough,
BY
Wolfe, Hubbard, Voit & Osann
ATTORNEYS.

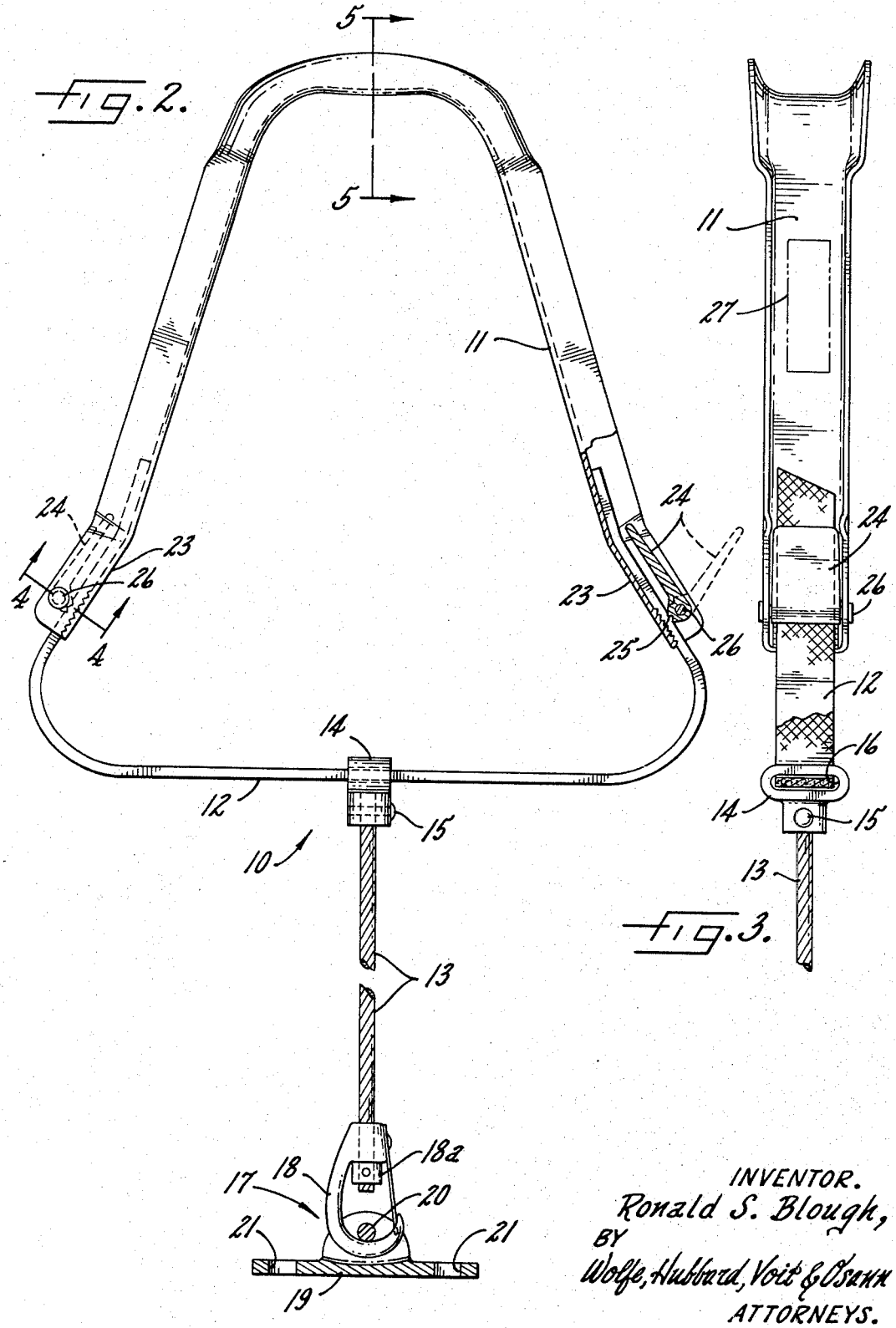

United States Patent Office 3,375,809
Patented Apr. 2, 1968

3,375,809
SWINE TETHER
Ronald S. Blough, Fairfield, Iowa, assignor to Fairfield Engineering and Manufacturing Company, Fairfield, Iowa, a corporation of Iowa
Filed Apr. 19, 1966, Ser. No. 543,621
9 Claims. (Cl. 119—118)

The present invention relates to livestock restraining means and more particularly concerns a swine tether for limiting the freedom of movement of such animals.

The desirability of employing livestock restraining devices for certain types of livestock has been recognized for many years. For example, stanchions, collars and neck chains have often been employed to limit the movement of cattle with respect to their mangers or feed troughs. This is particularly true in the case of milk cows. It has also been a common practice to hobble or tether horses and mules in order to limit their freedom of movement.

Recently, the advantages of restraining the movements of swine, such as sows during their gestation and farrowing periods, has also been recognized. However, due to the unique physical characteristics of swine, the restraining means employed in the past have been either so rigid as to completely restrain the animals to the point of serious discomfort or they have been unreliably loose.

Accordingly, it is the primary aim of the present invention to provide a swine tether that is not only reliable but also permits a reasonable amount of movement for the animal which it secures.

It is also an object of the invention to provide such a swine tether which may be adjusted to fit any one of a wide variety of animals that may differ considerably in both size and weight.

Another object of the invention is to provide a swine tether of the above type that can be easily put on or removed from the animal and which in use substantially eliminates the possibilities of gouging and becoming entangled or inverted with respect to the animal secured thereby.

Other objects and advantages of the invention will become more readily apparent upon reading the following detailed description and upon reference to the drawings in which:

FIG. 2 is a front elevation of the swine tether on an enlarged scale and partially in section;

Figures 4, 5:
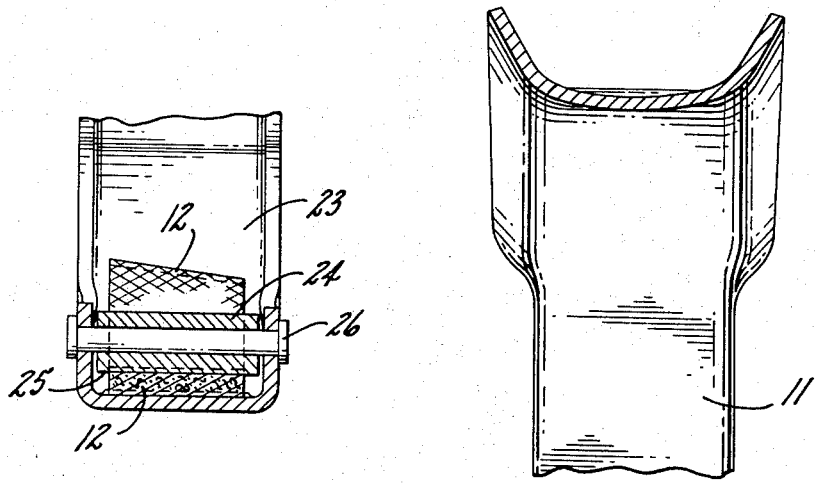

FIG. 3 is a fragmentary side elevation of the swine tether partially in section; and FIGS. 4 and 5, respectively, are enlarged, fragmentary sections as seen generally along lines 4—4 and 5—5 in FIG. 2.

While the invention will be described in connection with a preferred embodiment, it will be understood that I do not intend to limit the invention to that embodiment. On the contrary, I intend to cover all alternatives, modifications and equivalents as may be included within the spirit and scope of the invention as defined by the appended claims.

Figure 1:
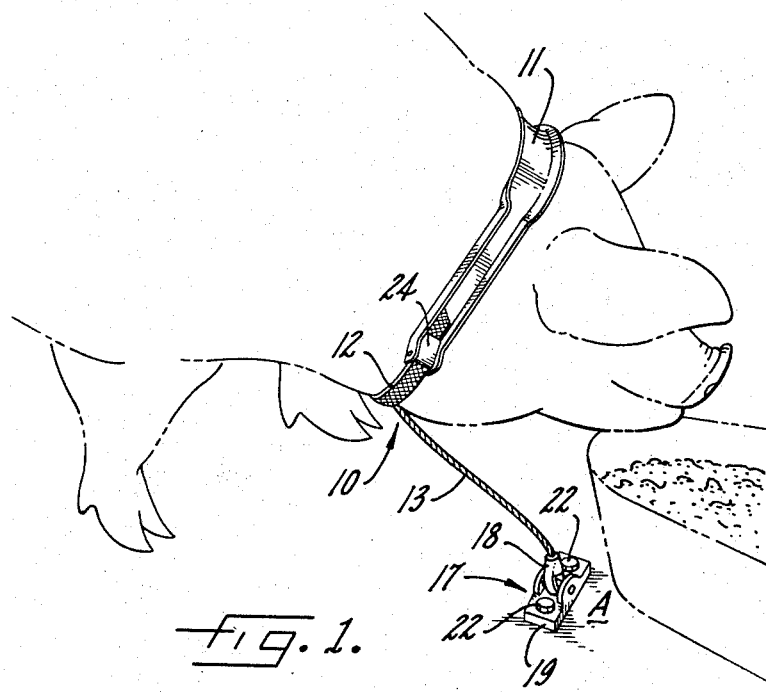
FIGURE 1 is a perspective view of the swine tether of the present invention as applied to an animal.

Turning now to the drawings, there is shown in FIGURE 1 a swine tether 10 embodying the novel features of the present invention for limiting the movements of an animal, such as a hog illustrated here in broken lines, with respect to some predetermined anchor point A. In the present instance, the anchor point A is located on the floor of the animal's pen a short distance away from the animal's feeding device, also illustrated in broken lines and not forming a part of the present invention. By this arrangement it will be appreciated that the tether 10 prevents the animal from turning and moving away from the anchor point A and into a position that would permit the animal to discharge waste into the feeding device.

As shown in FIG. 2, the tether 10 includes three basic elements, namely, a yoke member 11, a neck strap 12, and a flexible link 13. The yoke is formed with a generally inverted U-shaped configuration and is adapted to fit over the top and at least a portion of the animal's neck as seen in FIG. 1. The neck strap 12 is preferably a flexible element constructed of a heavy cloth material or webbing. The neck strap, of course, cooperates with the yoke to complete the encirclement of the animal's neck. The link 13 is illustrated here as formed of a stranded cable, but it should be appreciated that other forms, such as a chain, could also be employed.

To secure the link 13 to the strap 12, connecting means 14 are provided. As illustrated in FIGS. 2 and 3 the connecting means 14 comprises a sleeve member connected to one end of the link 13 such as by a pin 15. Preferably the sleeve member 14 defines an oblong aperture 16 adapted to receive and slidably retain the strap 12. In this way the sleeve is free to move toward or away from the center of the strap as the animal moves with respect to the anchor point A.

At the other end of the link 13 means 17 are provided for anchoring the link to the anchor point A. In the preferred embodiment the anchoring means 17 includes a hook 18 attached to the lower end of the link 13 and a slotted bracket 19 having a cross pin 20 to which the hook may be fastened. The bracket 19 is also provided with a pair of apertures 21 (see FIG. 2) adapted to receive a pair of bolts or screws 22 as shown in FIG. 1. The hook is preferably rotatably secured to the link 13 by means of a collar 18a which permits swiveling of the hook with respect to the link without danger of the link becoming twisted.

In the preferred embodiment, the yoke 11 is formed with a generally channel shaped cross section. This not only provides integral reinforcing, but also, eliminates any sharp edges on the inner side of the yoke that might injure the animal. Desirably, the yoke 11 is also formed so that the depending legs are flared outwardly at their lower ends 23 to prevent these ends from gouging into the animal.

For interconnecting the yoke 11 and the strap 12, a lever 24 with a self-tightening cam cleat 25 is pivotally mounted on a pin 26 bridging the channel shaped portion of each end 23 of the yoke. (See FIG. 4.) When the lever 24 is pivoted outwardly with respect to the yoke (see FIG. 2) the strap 12 is free for insertion or removal from the channel adjacent the end 23 of the yoke. Conversely, when the lever 23 is pivoted inwardly, the cam cleat 25 bites into the strap 12 and securely interconnects it with the yoke which may be provided with a serrated or roughened surface opposite the cam cleat. In this position, it will be appreciated that the lever 24 is shielded by the side walls of the channel shaped end 23 and the danger that the animal will disengage the cam cleat 25 by rubbing the yoke 11 on some foreign object is substantially precluded. It will also be recognized that the use of the self-tightening cam cleats 25 not only insure positive engagement between the yoke 11 and the strap 12, but also, provides a wide range of adjustment in the effective length of the strap in order to accommodate animals of different sizes and weights.

As previously mentioned, the yoke 11 is desirably formed with a generally inverted U-shaped configuration and a substantially channel shaped cross section. This construction has been found to be particularly advantageous in conforming the yoke to the shape of the upper neck portion of the animal to which the tether 10 is applied. It will, of course, be appreciated that the depending leg portions of the yoke are adapted to fit just rearwardly of the animal's jaw bones and the portion of the yoke between the legs fits over the animal's neck just behind the base of the skull. With the yoke fitted in this manner the strap 12 may be pulled snug without danger of interfering with the animal's eating, drinking or breathing.

To facilitate the use of the tether 10 on animals of different sizes and weights, the yoke 11 is desirably constructed in such a manner that the spread between the depending legs of the yoke can be altered without changing the general configuration of the legs. To this end the channel portion of the yoke between the legs is wider and shallower than the channel portion of the legs as shown in FIGS. 2, 3 and 5. Thus, when the spread of legs is changed, any bending of the yoke occurs in the portion between the legs and in this way the general configuration of the yoke and its conformity to the contour of the animal's neck is preserved.

From the foregoing, it will be appreciated that the present swine tether 10 is well suited for restraining the movements of various sized animals away from a predetermined anchor point A. Moreover, the novel construction and arrangement of the yoke 11, strap 12 and link 13 with its connecting means 14 and 17 is such that the tether is simple to apply, yet secure in use, and the dangers of injuring the animal or interfering with its eating, drinking or breathing is substantially eliminated. The tether 10 also provides a convenient device for identifying particular animals. In this regard an identifying number may be stamped or secured to the yoke 11 such as at 27.

I claim as my invention:

1. A swine tether for limiting movement of an animal away from a predetermined anchor point, comprising, in combination, a yoke member adapted to overlie the top and at least a portion of the sides of the animal's neck, said yoke member having at least one end portion formed with a generally channel shaped cross section, a neck strap for cooperating with said yoke to complete the encirclement of the animal's neck, at least one end of said neck strap being dimensioned to lie within and be protected by said channel shaped end portion of said yoke member, a flexible link, connecting means for securing one end of said link to said neck strap, and anchoring means for securing the other end of said link to said anchor point.

2. A swine tether as defined in claim 1 including means adjacent the end portions of said yoke member for securely interconnecting said strap and yoke, and at least one of said interconnecting means being adjustable in order to accommodate animals of different sizes and weights.

3. A swine tether as defined in claim 2 wherein said adjustable interconnecting means includes a lever with a self-tightening cam cleat pivoted in said channel shaped end portion so that when in its clamped position said lever is substantially shielded by the sides of said channel shaped end portion.

4. A swine tether as defined in claim 3 wherein the other end portion of said yoke member is also formed with a generally channel shaped cross section and the other end of said neck strap is adapted to lie therein and the other interconnecting means includes another lever formed with a self-tightening cam cleat pivoted in said other channel shaped end portion so that when in its clamped position said other lever is substantially shielded by the sides of said other channel shaped end portion.

5. A swine tether as defined in claim 1 wherein said yoke member is formed with a generally inverted U-shaped configuration having depending legs, and the lower ends of said depending legs are flared outwardly to prevent said lower ends from gouging into the animal's neck.

6. A swine tether as defined in claim 5 wherein the portion of said yoke member between said depending legs is yieldable whereby the spread between said legs may be altered to accommodate animals of different sizes and weights without altering the general configuration of said legs.

7. A swine tether as defined in claim 6 wherein substantially all of said yoke member is formed with a channel shaped cross section and the width and depth of the channel shaped cross section between said depending legs are respectively increased and decreased with respect to the channel shaped cross setcion of said depending legs.

8. A swine tether as defined in claim 1 wherein said link anchoring means includes a hook rotatably carried on said link and releasably secured to a bracket structure whereby said hook may be rotated with respect to said link and twisting of said link is substantially precluded.

9. A swine tether as defined in claim 1 wherein said link connecting means includes a sleeve member in which said strap is slidably retained.

References Cited

UNITED STATES PATENTS

| | | | |
|---|---|---|---|
| 353,842 | 12/1886 | Bristol | 54—34 |
| 811,586 | 2/1906 | Samuell | 119—118 |
| 1,408,764 | 3/1922 | Mott | 119—118 |
| 2,859,732 | 11/1958 | Driscoll | 119—106 |
| 3,166,049 | 1/1965 | Lundin | 119—96 |

FOREIGN PATENTS

| | | |
|---|---|---|
| 95,157 | 1/1963 | Denmark. |

ALDRICH F. MEDBERY, *Primary Examiner.*